_United States Patent Office_

3,827,990
Patented Aug. 6, 1974

3,827,990
IMPREGNATION OF POLYSTYRENE WITH TRICHLOROFLUOROMETHANE
Harold Austin Wright, Murrysville, Pa., assignor to Arco Polymers, Inc., Pittsburgh, Pa.
No Drawing. Filed Dec. 26, 1972, Ser. No. 318,470
Int. Cl. C08j 1/26
U.S. Cl. 260—2.5 B    5 Claims

ABSTRACT OF THE DISCLOSURE

A process has been developed for impregnating polystyrene particles with trichlorofluoromethane (Freon 11) using selected non-ionic surfactants dispersed in the blowing agent rather than in the water phase as is customary. Suitable surfactants are, for example, polyoxyethylene (20) sorbitan monolaurate, polyoxyethylene (23) lauryl ether, polyoxyethylene (20) monolaurate, polyoxyethylene (20) nonylphenol, and mixtures of these with an equal amount of a di-tertiary acetylenic glycol.

BACKGROUND OF THE INVENTION

The making of low-density, cellular, shaped plastic articles from expandable particles, granules, or beads of thermoplastic material such as styrene polymers is well known. Such particles generally contain a blowing agent which is a non-solvent for the thermoplastic material and which boils below the softening point of the material. The blowing agent causes the particles to expand when they are subjected to heat. These particles are placed in a mold cavity which defines the shape of the desired finished article. The particles are heated above their softening point, for example, by steam injected under pressure into the mold cavity, whereupon the particles expand to fill the mold cavity and fuse together.

One method of making the expandable particles is by a process known as post impregnation. In this process, discrete styrene polymer particles are suspended in water with the aid of a surfactant system. The blowing agent, usually n-pentane is then added to the aqueous suspension and allowed to impregnate the particles.

Many patents relating to the preparation of expandable polymer particles teach that the blowing agent must be a "non-solvent" for the polymer and may be compounds such as pentane and trichlorofluoromethane. However, it is to be noted that none of these patents contain examples of trichlorofluoromethane being used alone.

Surprisingly, when I attempted to impregnate polystyrene particles with trichlorofluoromethane by the post impregnation process, the suspension of polystyrene in water failed, i.e., the particles agglomerated. The agglomeration was apparently caused by the fact that trichlorofluoromethane is in fact a good solvent for the polystyrene rather than a non-solvent as previously taught by the prior art.

SUMMARY OF THE INVENTION

It has now been found that expandable polystyrene particles containing trichlorofluoromethane blowing agent can be prepared by adding a dispersion of selected non-ionic surfactants in the trichlorofluoromethane to a slurry of the polystyrene particles in water, and allowing the blowing agent to impregnate the particles. Preferred surfactants are the polyoxyethylene sorbitan monoesters of fatty acids, polyoxyethylene monoesters of fatty acids, polyoxyethylene monoethers of long chain alcohols, and polyoxyethylene monoethers of alkylphenols, where said surfactants have HLB numbers of between 15 and 18.

DETAILED DESCRIPTION OF THE INVENTION

The polystyrene used in the impregnation process of the invention may be in the form of granules, pellets, particulate pieces or even comminuted sheets of such polymer. Preferably, the polymer is in the form of beads, which are advantageously prepared by suspension polymerization.

The particles of polystyrene are slurried in water prior to the addition of the dispersion of surfactant in trichlorofluoromethane. The ratio of polymer particles to water is in the range of between 0.3:1 and 1:1, preferably 0.67:1.

To the polystyrene slurry is then added a dispersion of a surfactant in trichlorofluoromethane (Freon 11).

Because of the greater density of the Freon than that of most ordinary blowing agents (such as pentane), the Freon must be added to the polystyrene in amounts ranging from 7 to 40 parts of Freon per 100 parts of polymer. Pentane is normally used in amounts from 3 to 15 parts per 100 parts of polymer.

In the process of this invention, the Freon 11 must have dispersed therein from 0.2 to 1 part per 100 parts of polymer of a surfactant system. Surfactants which are useful in the invention are polyoxyethylene derivatives which contain an average of from about 15–50 moles of ethylene oxide per molecule in the polyoxyethylene moiety. Suitable derivatives are the polyoxyethylene sorbitan monoesters of fatty acids, polyoxyethylene monoesters of fatty acids, polyoxyethylene monoethers of long-chain alcohols, and polyoxyethylene monoethers of alkylphenols. The alkyl portion of the alkylphenols may contain from 8 to 12 carbon atoms, while the fatty acid or fatty alcohol portion is derived from those acids or alcohols having from 10–18 carbon atoms.

To be useful in the process of the invention, the surfactant must have an HLB number of between about 15 and 18. If the HLB number is below about 15, then the suspension of the polystyrene particles in the impregnation process tends to fail or at least the particles may agglomerate to form clusters of larger particles. Similar loss of suspension occurs with surfactants having HLB above about 18. The HLB number is defined as the hydrophile-lypophile balance [see W. C. Griffin, J. Society Cosmetics Chemists *1*, 311 (1949)]. While the HLB number can be determined experimentally by the process described by Griffin in the above-mentioned article, it can also be calculated using various formulas. For example, $$\mathrm{HLB} = 20\left(1 - \frac{S}{A}\right)$$

where S is the saponification number of the ester and A is the acid number of the acid. Where it is difficult to get good saponification number data, the relation $$\mathrm{HLB} = \frac{E+P}{5}$$

is used where E is the weight percentage of oxyethylene content and P is the weight percentage of the polyhydric alcohol content. In products where only ethylene oxide is present in the hydrophilic portion and for fatty alcohol-ethylene oxide condensation products, the last equation may be reduced to $$\mathrm{HLB} = \frac{E}{5}$$

Suitable surfactants include polyoxyethylene sorbitan monoesters of fatty acids such as polyoxyethylene (20) sorbitan monolaurate, polyoxyethylene (20) sorbitan monopalmitate, polyoxyethylene (20) sorbitan monostearate, polyoxyethylene (20) sorbitan monooleate; polyoxyethylene monoesters of fatty acids such as polyoxyethylene (20) monolaurate, polyoxyethylene (20) monostearate; polyoxyethylene monoethers of fatty alcohols such as polyoxyethylene (23) monolauryl ether, polyoxyethylene (20) monocetyl ether; and polyoxyethylene monoethers of alkylphenols such as polyoxyethylene (20) nonylphenol and polyoxyethylene (30) nonylphenol. The numbers in the brackets represent the number of ethylene oxide moles per molecule in the polyoxyethylene moieties. Mixtures of these surfactants may also be utilized.

Also suitable as a surfactant to be used in the Freon dispersion is an equal weight mixture of the polyoxyethylene surfactants and a di-tertiary acetylenic glycol (such as Surfynol 104 sold by Air Products and Chemicals, Inc.). Surprisingly, although the glycol alone is ineffective as a surfactant in the process of the invention, it acts in a synergistic manner to fortify and intensify the effectiveness of the other surfactants.

The surfactant system must be used in amounts of between 0.2 and 1.0 percent by weight based on the polymer. If less than about 0.2 percent is used, the polymer particles agglomerate excessively during the impregnation. Greater than 1.0 percent surfactant serves no useful purpose.

The surfactant must be utilized as a dispersion in the Freon 11. The addition of the surfactant to the polymer-water slurry followed by the addition of the Freon results in either loss of suspension or agglomeration of the particles to large clusters.

If other additives, such as fire retardants, dyes, pigments, etc., are to be added during the impregnation process, these may be premixed with the surfactant-Freon 11 dispersion and added to the polymer-water slurry in this form or in some cases may be added directly to the polymer-water slurry.

After the surfactant-Freon 11 dispersion has been added to the polymer-water slurry, the mixture is heated, with agitation, at a temperature of between 80 and 120° C. for 3 to 10 hours to impregnate the polymer particles with the trichlorofluoromethane.

The impregnation mixture is then cooled to room temperature and the particles removed, washed and dried.

The invention is further illustrated by the following examples.

Example I

To a 12 oz. crown cap bottle were added in order, 160 g. of water, 0.46 g. of sodium dodecylbenzenesulfonate, 6.6 g. of tricalcium phosphate and 60 g. of polystyrene beads having a particle size of predominantly through 16 and on 30 mesh, U.S. Standard Sieve. The mixture was stirred, and 5 g. of n-pentane was added and the bottle was sealed. The bottle was then heated at 90° C. for 10 hours while being subjected to end-over-end agitation to impregnate the polymer beads with the pentane blowing agent. The suspension was then cooled to room temperature, acidified to a pH of 1.4 with hydrochloric acid, the beads separated from the aqueous phase by centrifugation, washed with water, and air dried at room temperature. On sieve analysis, the impregnated beads were found to be predominantly the same size as the initial beads, i.e., only 1% by weight of the beads had agglomerated to a particle size larger than 14 mesh.

A simultaneous experiment was run under identical conditions except that the 5 g. of pentane was replaced by 12 g. of trichlorofluoromethane (Freon 11). The greater weight of Freon was used to provide for equivalent volumes of blowing agent. The density of the Freon 11 is 1.49 compared to pentanes 0.63. Sieve analysis of this product showed 46% by weight of the product beads agglomerated to a size greater than 14 mesh. The excessive agglomeration of the polymer beads in the presence of Freon 11 was attributable to the high solubility of polystyrene in the Freon.

It is thus shown that, contrary to previous teachings of the art, Freon 11 is not a suitable blowing agent for use in impregnating polystyrene beads in the usual post impregnation process.

Example II

Several impregnations were run in accordance with the method of the invention using commercial surfactant mixtures having various emulsifying power as measured by the HLB rating of the mix. Thus to each of a series of 12 oz. crown cap bottles was added 120 g. of water, and 80 g. of polystyrene beads of size as described in Example I. The bead-water slurry was chilled in an ice bath for 15 minutes to cool the slurry to prevent boiling of the Freon dispersion when added.

To each bottle was added a dispersion of 0.32 g. of Atlas Mix (sold by Atlas Chemical Industries) dispersed in 16 g. of Freon 11. The bottles were then capped and heated at 110° C. for 4 hours while being agitated by end-over-end tumbling. The bottles were then cooled and the amount of agglomeration estimated. The results are shown in Table I.

TABLE I

| Run number | HLB No. of Atlas Mix | Agglomeration |
|---|---|---|
| II-1 | 2 | Lost suspension. |
| II-2 | 6 | Do. |
| II-3 | 10 | Many clusters. |
| II-4 | 12 | Do. |
| II-5 | 14 | Do. |
| II-6 | 16 | Few clusters. |
| II-7 | 18 | Many clusters. |

The results indicated that the useful HLB range for the surfactant was around 16 for the Atlas mixes.

Example III

In order to determine the range of HLB numbers applicable for an individual type of surfactant, the following series of impregnations was run using dispersions of 0.20 g. of various Tween surfactants (sold by Atlas Chemical Industries) dispersed in 16 g. of Freon 11. The Tween surfactants were polyoxyethylene sorbitan monoesters containing 20 moles of ethylene oxide per molecule in the polyoxyethylene moiety and have the HLB number indicated in the Table II. To each of a series of 12 oz. crown cap bottles was added 120 g. of water and 80 g. of polystyrene beads (through 16 and on 30 mesh, U.S. Standard Sieve) and the slurries were cooled in an ice bath to prevent boiling of the Freon when added. To each bottle was added one of the dispersions of Tween in Freon mentioned above. The bottles were then capped and heated at 110° C. for 4 hours while being agitated by end-over-end tumbling. The amount of agglomeration was estimated and is estimated and is shown in Table II.

TABLE II

| Run number | Surfactant (monoester) | HLB No. of surfactant | Agglomeration |
|---|---|---|---|
| III-1 | Tween 60 (stearate) | 14.9 | Few clusters. |
| III-2 | Tween 80 (oleate) | 15.0 | Do. |
| III-3 | Tween 40 (palmitate) | 15.6 | Do. |
| III-4 | Tween 20 (laurate) | 16.7 | Do. |

From the data in Table II it is seen that for the Tween surfactants, compounds having HLB numbers from about 15 to 17 have acceptable dispersing power and give products having only a few clusters when using the reduced 0.20 gram charge of surfactant.

Example IV

To illustrate that the method of the invention is indeed unexpected and novel, the following two experiments were run. Thus to one 12 oz. crown cap bottle was added 120 g. of water, 80 g. of polystyrene beads, and 0.20 g. of polyoxyethylene (20) sorbitan monolaurate and the mixture cooled as before. To this bottle was then added 16 g. of Freon 11.

To a second 12 oz. bottle was added 120 g. of water and 80 g. of polystyrene beads and the mixture was cooled as before. A dispersion of 0.20 g. of polyoxyethylene (20) sorbitan monolaurate in 16 g. of Freon 11 was then added according to the method of the invention.

Both bottles were then capped, heated with end-over-end tumbling at 110° C. for 4 hours, and the resulting beads visually inspected. The first bottle was seen to have many clusters in the beads, whereas the second bottle again had only a very few clusters.

These results again show that Freon is too good a solvent for the polystyrene and cannot be added in the normal impregnation method but must be added as a dispersion of surfactant in the Freon to prevent excess agglomeration.

Example V

To further illustrate the method of the invention several impregnations were effected using various surfactants and surfactant mixtures. In all cases the surfactant was first dispersed into 16 g. of Freon 11 and then the dispersion added to bottles containing 120 g. of water and 80 g. of polystyrene beads. The filled bottles were then capped, agitated, and heated at either 110° C. for 4 hours or at 90° C. for 10 hours. Where percentages of agglomerated beads are reported, the values represent the percent of beads which were too large to pass through a 10 mesh U.S. Standard Sive. The results are shown in Table III.

TABLE III

| Run No. | Surfactant system surfactant | HLB No. | Grams | Heating cycle, °C./hrs. | Agglomeration, percent |
|---|---|---|---|---|---|
| V-1 | Polyoxyethylene (20) sorbitan monolaurate. | 16.7 | 0.5 | 110/4 | 2 |
| V-2 | Polyoxyethylene (20) nonylphenol. | ~16.0 | 0.5 | 110/4 | 3 |
| V-3 | Polyoxyethylene (15) nonylphenol. | 15.0 | 0.5 | 90/10 | 13 |
| V-4 | Polyoxyethylene (30) nonylphenol. | ~17.2 | 0.5 | 90/10 | (¹) |
| V-5 | Surfynol 104* | 5.1 | 0.5 | 90/10 | 100 |
| V-6 | {Polyoxyethylene (15) nonylphenol. | 15.0 | 0.25 | 90/10 | 1 |
|  | Surfynol 104 | 5.1 | 0.25 |  |  |
| V-7 | {Polyoxyethylene (20) nonylphenol. | 16.0 | 0.25 | 90/10 | 0 |
|  | Surfynol 104 | 5.1 | 0.25 |  |  |
| V-8 | {Polyoxyethylene (30) nonylphenol. | ~17.2 | 0.25 | 90/10 | 0 |
|  | Surfynol 104 | 5.1 | 0.25 |  |  |
| V-9 | {Polyoxyethylene (20) sorbitan monolaurate. | 16.7 | 0.25 | 90/10 | 0 |
|  | Surfynol 104 | 5.1 | 0.25 |  |  |

¹ Some clusters.

*A di-tertiary acetylenic glycol of molecular weight 200-250 sold by Air Products & Chemicals, Inc.

It can be seen that although Surfynol 104 alone is ineffective as a surfactant in the process of the invention, it acts in a synergistic manner to fortify and intensify the effectiveness of the other surfactants.

What is claimed is:
1. A process for making expandable polystyrene particles comprising:
   (a) forming a dispersion of 0.2 to 1.0 part of a polyoxyethylene type surfactant in 7 to 40 parts of trichlorofluoromethane, said surfactant having an HLB number of between 15 and 18 and being selected from the group consisting of polyoxyethylene sorbitan monoesters of fatty esters, polyoxyethylene monoesters of fatty acids, polyoxyethylene monoethers of long chain alcohols, and polyoxyethylene monoethers of alkylphenols;
   (b) adding the dispersion to a slurry of 100 parts of polystyrene particles in from 90 to 333 parts of water to form a suspension;
   (c) heating the suspension with agitation at a temperature of 80 to 120° C. for 3 to 10 hours to impregnate the particles with the trichlorofluoromethane; and
   (d) separating the resulting impregnated particles from the water.

2. The process of Claim 1 wherein said surfactant has an average ethylene oxide content per molecule of from about 15–50 moles.

3. The process of Claim 1 wherein the fatty acid or fatty alcohol portion comprises those fatty acids and fatty alcohols containing from 10–18 carbon atoms.

4. The process of Claim 1 wherein the alkylphenols have from 8 to 12 carbon atoms in the alkyl portion of the molecule.

5. The process of Claim 1 wherein said dispersion comprises trichlorofluoromethane having dispersed therein a 50–50 mixture of said surfactant and a di-teritary acetylenic glycol co-surfactant.

References Cited

UNITED STATES PATENTS

| 3,503,908 | 3/1970 | Ingram et al. | 260—2.5 B |
| 2,911,381 | 11/1959 | Roth | 260—2.5 B |
| 3,058,926 | 10/1962 | Eichhorn | 260—2.5 B |
| 2,848,428 | 8/1958 | Rubens | 260—2.5 B |
| 3,501,426 | 3/1970 | Edmonton | 260—2.5 B |

MORTON FOELAK, Primary Examiner

U.S. Cl. X.R.

260—93.5 W